(12) United States Patent
Caffrey et al.

(10) Patent No.: US 8,331,417 B2
(45) Date of Patent: Dec. 11, 2012

(54) ENERGY EFFICIENCY IN WIRELESS COMMUNICATION SYSTEMS

(75) Inventors: Michael Paul Caffrey, Los Alamos, NM (US); Joseph McRae Palmer, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 302 days.

(21) Appl. No.: 12/763,973

(22) Filed: Apr. 20, 2010

(65) Prior Publication Data
US 2011/0255571 A1  Oct. 20, 2011

(51) Int. Cl.
*H04B 1/00* (2006.01)
(52) U.S. Cl. .................................. 375/130; 375/141
(58) Field of Classification Search .................. 375/130, 375/140, 141, 146–147, 259–260
See application file for complete search history.

(56) References Cited

U.S. PATENT DOCUMENTS

| | | | |
|---|---|---|---|
| 5,189,683 A | 2/1993 | Cowart | |
| 5,341,396 A | 8/1994 | Higgins et al. | |
| 5,471,497 A | 11/1995 | Zehavi | |
| 5,687,190 A | 11/1997 | Tsao | |
| 6,009,118 A | 12/1999 | Tiemann et al. | |
| 6,028,883 A | 2/2000 | Tiemann et al. | |
| 6,028,887 A | 2/2000 | Harrison et al. | |
| 6,266,361 B1 | 7/2001 | Huang et al. | |
| 6,320,850 B1 | 11/2001 | Perahia et al. | |
| 6,400,755 B1* | 6/2002 | Harris et al. | 375/146 |
| 6,445,702 B1 | 9/2002 | Wright | |
| 6,763,058 B1 | 7/2004 | Morris | |
| 6,810,073 B1* | 10/2004 | Karlsson | 375/144 |
| 7,068,615 B2 | 6/2006 | Niesen | |
| 7,295,638 B2 | 11/2007 | Martin et al. | |
| 7,317,750 B2 | 1/2008 | Shattil | |
| 7,430,167 B2 | 9/2008 | Glaise et al. | |
| 7,469,124 B1 | 12/2008 | Chethik | |
| 7,539,167 B2 | 5/2009 | Meilhac et al. | |
| 7,593,449 B2 | 9/2009 | Shattil | |
| 7,693,140 B2* | 4/2010 | Sudo | 370/355 |
| 2001/0008542 A1* | 7/2001 | Wiebke et al. | 375/141 |
| 2002/0071479 A1 | 6/2002 | Giallorenzi et al. | |
| 2003/0011672 A1* | 1/2003 | Emge et al. | 347/248 |
| 2004/0131028 A1 | 7/2004 | Schiff et al. | |
| 2005/0129058 A1* | 6/2005 | Casaccia et al. | 370/464 |
| 2005/0185725 A1* | 8/2005 | Maeda et al. | 375/260 |
| 2006/0007892 A1* | 1/2006 | Sudo | 370/335 |
| 2007/0121758 A1 | 5/2007 | Sindhushayana et al. | |
| 2007/0263734 A1* | 11/2007 | Seki | 375/259 |
| 2008/0013518 A1 | 1/2008 | Chen | |

(Continued)

*Primary Examiner* — Jean B Corrielus
(74) *Attorney, Agent, or Firm* — Matthew Lambrinos; Ryan B. Kennedy (57) ABSTRACT

Wireless communication systems and methods utilize one or more remote terminals, one or more base terminals, and a communication channel between the remote terminal(s) and base terminal(s). The remote terminal applies a direct sequence spreading code to a data signal at a spreading factor to provide a direct sequence spread spectrum (DSSS) signal. The DSSS signal is transmitted over the communication channel to the base terminal which can be configured to despread the received DSSS signal by a spreading factor matching the spreading factor utilized to spread the data signal. The remote terminal and base terminal can dynamically vary the matching spreading factors to adjust the data rate based on an estimation of operating quality over time between the remote terminal and base terminal such that the amount of data being transmitted is substantially maximized while providing a specified quality of service.

17 Claims, 8 Drawing Sheets

U.S. PATENT DOCUMENTS

| | | | |
|---|---|---|---|
| 2008/0057933 A1* | 3/2008 | Brunner | 455/422.1 |
| 2008/0181108 A1 | 7/2008 | Hashmi et al. | |
| 2009/0034654 A1 | 2/2009 | Inukai et al. | |
| 2009/0110033 A1 | 4/2009 | Shattil | |
| 2009/0201902 A1* | 8/2009 | Miki et al. | 370/342 |
| 2012/0082270 A1* | 4/2012 | Kent et al. | 375/340 |

* cited by examiner

Data Frame Formatting

ENERGY EFFICIENCY IN WIRELESS COMMUNICATION SYSTEMS

STATEMENT REGARDING FEDERAL RIGHTS

This invention was made with Government support under Contract Number DE-AC52-06NA25396 awarded by the United States Department of Energy. The Government has certain rights in the invention.

TECHNICAL FIELD

The present invention relates to wireless communication systems and, more particularly, to direct sequence spread spectrum systems and methods implemented in such communication systems.

BACKGROUND

Wireless mobile and remote sensing communication systems generally utilize a base terminal and a remote terminal. The remote terminal is the transmitter and the base terminal is the receiver. The base terminal that receives data from the remote terminal typically has more energy, mass, and volume resources. The wireless communication channel between the remote terminal and base terminal varies over time due to various factors including mobility of either or both the remote terminal and base terminal (changes in range), interference, fading, variation in noise, variation in antenna pointing, or variation in polarization mismatch.

There is a need to provide systems and methods for improving the performance of wireless mobile and remote sensing communication systems.

SUMMARY

According to one aspect of the present invention, a wireless communication system is provided. The system has one or more remote terminals, one or more base terminals, and a communication channel between the remote terminal(s) and base terminal(s). The remote terminal can be configured to apply a direct sequence spreading code to a data signal at a spreading factor to provide a direct sequence spread spectrum (DSSS) signal. The remote terminal can be further configured to transmit the DSSS signal over the communication channel to the base terminal. The base terminal can be configured to receive the DSSS signal from the remote terminal. The base terminal can be further configured to despread the received DSSS signal by a spreading factor matching the spreading factor utilized to spread the data signal. The remote terminal and base terminal can be configured to dynamically vary the matching spreading factors to adjust the data rate based on an estimation of operating quality over time between the remote terminal and base terminal such that the amount of data being transmitted is substantially maximized whilst providing a specified quality of service.

According to another aspect of the present invention, a multiple access wireless communication system is provided. The system has a plurality of remote terminals, one or more base terminals; a shared communication channel between the plurality of remote terminals the base terminal(s), and a plurality of back channels between the plurality of remote terminals and the base terminal(s). Each one of the remote terminals can be configured to apply a direct sequence spreading code to a data signal utilizing an associated spreading code and spreading factor to provide a direct sequence spreading spectrum (DSSS) signal; and to transmit the DSSS signal over the shared communication channel to the base terminal(s). The base terminal(s) can be configured to receive respective DSSS signals from respective remote terminals; and despread received DSSS signals utilizing respective spreading codes and spreading factors matching the spreading codes and spreading factors utilized in respective remote terminals. For each one of the received DSSS signals, the base terminal is further configured to dynamically monitor the DSSS signal to estimate the operating quality over time between the remote terminal transmitting the DSSS signal and the base terminal; determine that the estimated operating quality has exceeded a limit of a quality margin; in response to the estimated operating quality exceeding the quality margin limit, estimate a next data transmission rate that is sufficient to provide an operating quality within the quality margin such that the specified quality of service is met for the next data rate; and send a command over a back channel to the remote terminal transmitting the DSSS signal for adjusting the spreading factor to adjust the data rate to the estimated next data rate. For each one of the received DSSS signals, the remote terminal transmitting the DSSS signal and the base terminal are configured to dynamically adjust the matching spreading factors to dynamically adjust the data rate to the next data rate such that the amount of data transmitted is substantially maximized whilst providing the specified quality of service for the remote terminal transmitting the DSSS signal.

According to yet another aspect of the present invention, a method for improving energy efficient channel utilization in a wireless or communication system is provided. The method comprises direct sequence spectrum spreading a data signal by a spreading factor to provide a direct sequence spread spectrum (DSSS) signal; transmitting the DSSS signal from a remote terminal over a communication channel to a base terminal; receiving the DSSS signal from the remote terminal; despreading the received DSSS signal by a spreading factor matching the spreading factor utilized to spread the data signal; and dynamically vary the matching spreading factors to adjust the data rate based on an estimation of operating quality over time between the remote terminal and base terminal such that the amount of data transmitted is substantially maximized whilst providing the specified quality of service.

According to yet another aspect of the present invention, there is provided a remote terminal for communicating with a base terminal over a communication channel. The remote terminal has direct sequence spread spectrum circuitry for applying a direct sequence spreading code to a data signal by a spreading factor to provide a direct sequence spread spectrum (DSSS) signal; transmitter circuitry for transmitting the DSSS signal over the communication channel to the base terminal; and a controller for dynamically vary the spreading factor to adjust the data rate based on an estimation of operating quality over time between the remote terminal and base terminal such that the amount of data being transmitted is substantially maximized whilst providing a specified quality of service.

According to yet another embodiment of the present invention, there is provided a base terminal for receiving a DSSS signal transmitted from at least one remote terminal over a communication channel. The base terminal has receiver circuitry for receiving the DSSS signal; direct sequence spread spectrum despreading circuitry for despreading the received DSSS signal by a spreading factor matching the spreading factor utilized to spread the data signal; and a controller for dynamically varying the spreading factor to adjust the data rate based on an estimation of operating quality over time between the remote terminal and base terminal such that the amount of data being received is substantially maximized whilst providing a specified quality of service.

BRIEF DESCRIPTION OF THE DRAWINGS

In order that the present invention may be more readily understood, reference will now be made to the accompanying drawings, in which.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to a person of ordinary skill in the art that the present invention may be practiced in other embodiments that depart from these specific details. For example, while some example embodiments are directed to radio communication systems and methods, communication systems and methods of other embodiments can be implemented in optical or acoustic communication systems. Furthermore, whilst one embodiment is directed to a point-to-point or point-to-multipoint communication system and method, communication systems and methods of other embodiments can be implemented in systems that do not require point-to-point or point-to-multipoint communication between the terminals.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), using a field programmable gate array (FPGA), and/or using one or more digital signal processors (DSPs).

The following has been identified by the Applicant. Wireless mobile and remote sensing systems, such as small satellites, unmanned aerial vehicles (UAVs), rovers, and handsets, need to transmit as much data as possible with the least amount of energy. By conserving energy, the systems can be lighter, cheaper, have greater operational endurance, and function at greater range. The wireless communication channel between the remote terminal and base terminal varies over time due to mobility of either or both the remote terminal and base terminal (changes in range). Other factors that cause changes in the communication channel include fading, antenna pointing, polarization, antenna noise, multipath, interference, jamming, or multiple users (multiple access). It is desirable to use the transmitted energy efficiently because it is a scarce resource.

It has been identified that transmitted energy used for communication can be more efficiently employed in wireless communication systems by adopting a direct sequence spread spectrum (DSSS) communication approach in which the spreading factor for spreading the data signal being transmitted is dynamically adjusted in order to change the data rate based on an estimation over time of the quality of the communication channel between the remote terminal and the base terminal. By adopting this approach in a plurality of terminals and configuring the terminals to share the communication channel, channel capacity can be efficiently and seamlessly allocated as the number of users varies.

Reference will now be made to the accompanying drawings in which like reference numerals refer to identical or functionally-similar elements throughout the separate views.

Figure 1:
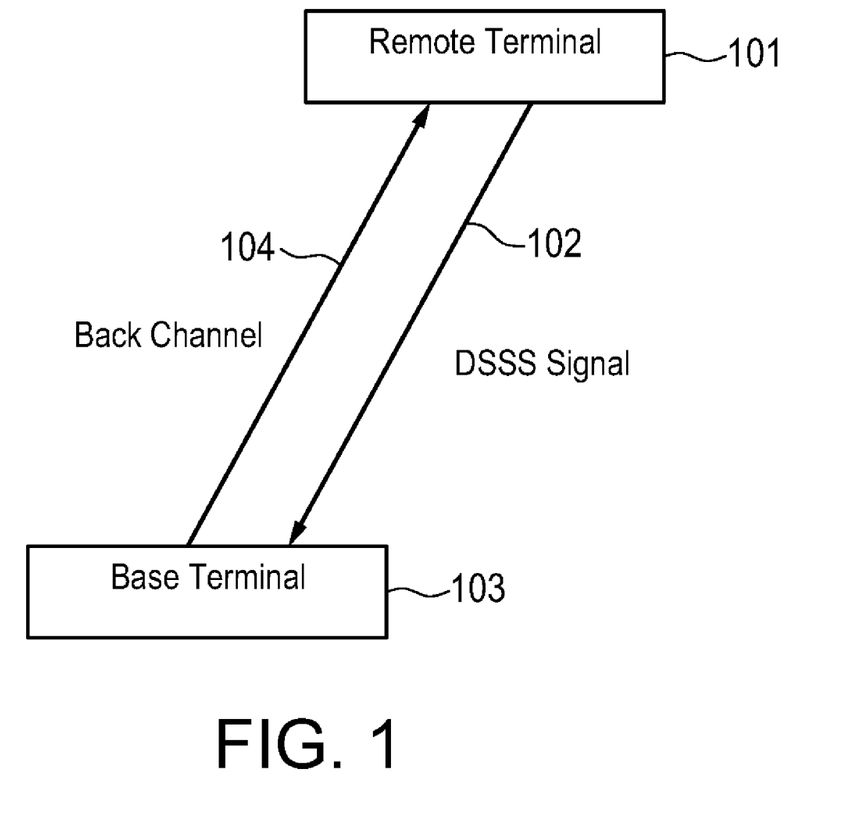
FIG. 1 illustrates an example of a wireless communication system according to one embodiment.

FIG. 1 illustrates a schematic diagram of a communication system 100 according to one embodiment. System 100 is a wireless point-to-point communication system, such as the type utilized in small satellite, UAV, rover, handsets or other types of point-to-point or point-to-multipoint mobile communication systems. A point-to-point or point-to-multipoint communication system is defined herein to mean any communication system that transmits data from a source to a destination without the use of switches or regenerative repeaters between the transmitter and the receiver. System 100 has a remote terminal 101 and a base terminal 103. A communication channel 102 is arranged between the remote terminal 101 and base terminal 103. The communication channel is a point-to-point DSSS communication channel.

As already mentioned above, communication systems other than point-to-point or point-to-multipoint communication systems can be employed in alternative embodiments. Whilst in the example of FIG. 1, remote and base terminals are radio terminals, the terminals can be other types of communication terminals such as optical terminals for optical communication systems or acoustic terminals for underwater or other types of communication system applications. Any type of terminals can be adopted which can be employed in a wireless communication system and which are adapted according to the illustrative embodiments herein.

As will be explained more fully below with reference to examples, remote terminal 101 has direct sequence spread spectrum circuitry for applying a direct sequence spreading code to a data signal at a spreading factor to provide a direct sequence spread spectrum (DSSS) signal; transmitter circuitry for transmitting the DSSS signal over the communication channel to the base terminal; and a controller for dynamically varying the spreading factor to adjust the data rate based on an estimation of operating quality over time between the remote terminal and base terminal such that the amount of data being transmitted is substantially maximized whilst providing a specified quality of service. Base terminal 103 has a receiver circuitry for receiving the DSSS signal, direct sequence spread spectrum despreading circuitry for despreading said received DSSS signal by a spreading factor matching said spreading factor utilized to spread the data signal, and a controller for dynamically varying the spreading factor to adjust the data rate based on an estimation of operating quality over time between the remote terminal and base terminal such that the spreading factor amount of data being received is substantially maximized whilst providing a specified quality of service.

Figure 5:
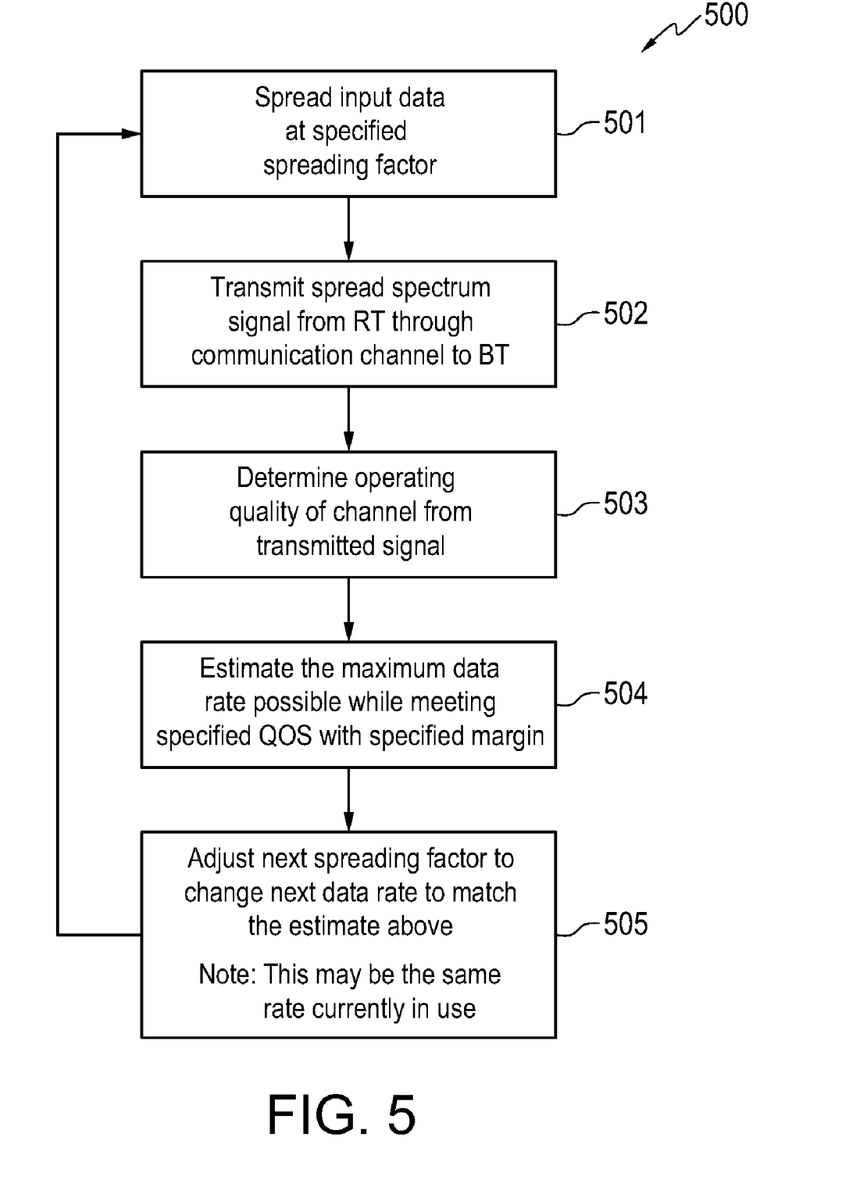
FIG. 5 illustrates a flow diagram outlining an example of a method of improving channel utilization according to one embodiment.

A method 500 for improving channel utilization in a wireless communication system according to one embodiment will now be outlined with reference to FIG. 5. Method 500 can be implemented in the system of FIG. 1. As indicated in FIG. 5, input data to be transmitted is direct sequence spread at a specified spreading factor (501). The spreading factor is selected to set a data rate of the remote terminal. The spread spectrum signal is transmitted from the remote terminal through the communication channel to the base terminal (502). Operating quality of the channel is determined from the transmitted signal (503). An estimate is made of the maximum data rate possible while maintaining a specified quality of service within a quality margin (504). Quality of service is defined herein to mean the level of communication performance. Quality of service can be expressed as a minimum bit error rate, specific link margin, or other performance parameter. The next spreading factor is adjusted to change the next data rate to substantially match the estimated maximum possible data rate (505). The process can then return to process 501 and repeat to dynamically adjust the spreading factor to transmit a substantially maximum amount of data while providing the specified quality of service.

By estimating operating quality over time and dynamically adjusting the matching factors to adjust the data rate according to the estimated quality over time, a substantially maximum amount of data is transmitted from the remote terminal to the base terminal whilst maintaining the specified quality of service as channel conditions vary.

As will be explained in more detail below, the communication systems of the illustrative embodiments can be configured in different ways to dynamically vary the matching spreading factors to change the data rate to provide the maximum data rate possible based on an estimation of the operating quality over time between the remote terminal and the base terminal. The communication systems can be configured to provide closed loop data rate & spreading factor control in which the base terminal monitors the transmitted signal quality and commands the remote terminal via a back channel to adjust the spreading factor based on the monitored quality. The communication systems can alternatively or additionally provide open loop data rate/spreading factor control in which both terminals utilize preset rate & spreading factor commands based on a forecast of the channel operating quality to dynamically adjust the spreading factor.

By way of example, communication system of FIG. 1 is configured such that it can selectively operate as a closed loop control system and an open loop system. In order for the system to operate as a closed loop control system, a back channel 104 is provided between the remote terminal and base terminal and the base terminal has a transmitter (not shown) for sending commands over the back channel back to a receiver (not shown) of the remote terminal. Remote terminal 101 and base terminal 103 are configured to allow the matching spreading factors to be dynamically varied based on an estimation of the operating quality of the signal over time.

Figure 2:
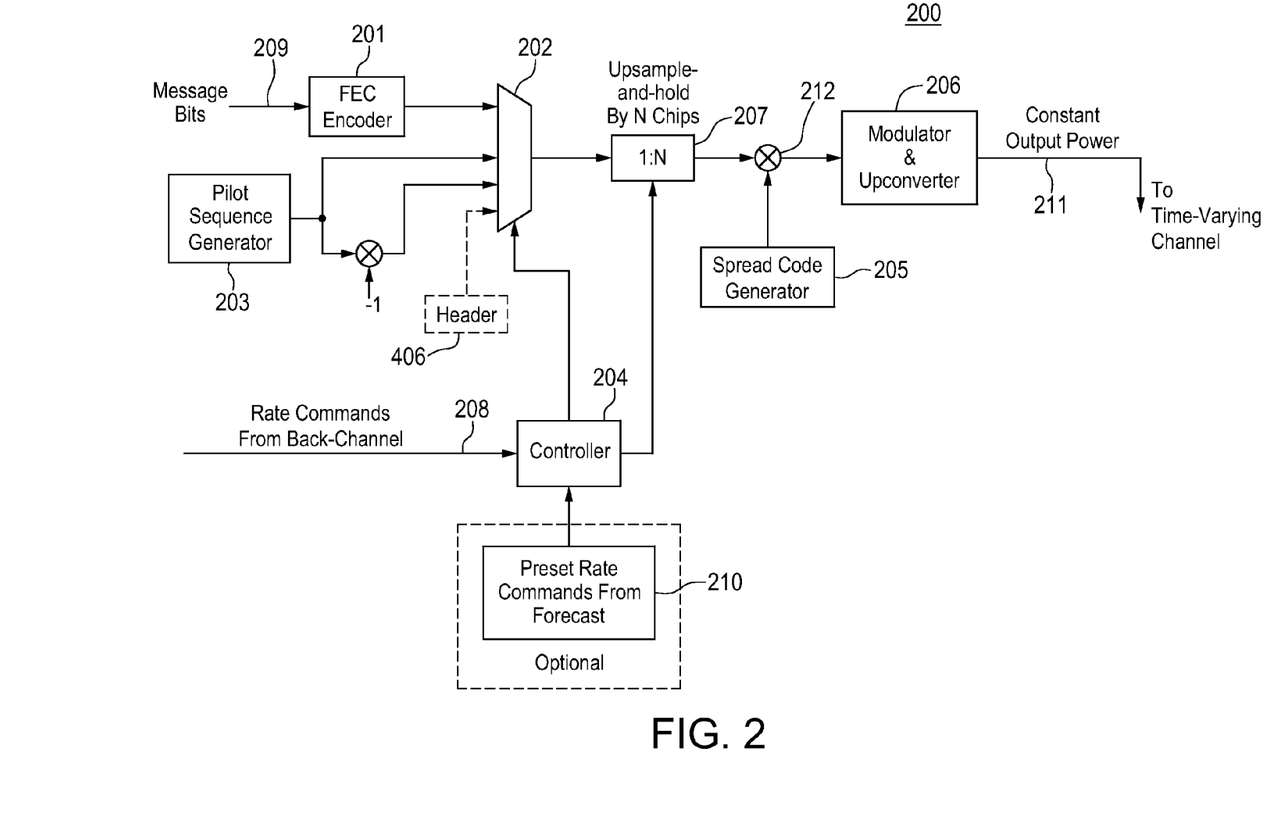
FIG. 2 is a block diagram of an exemplary remote terminal of the system of FIG. 1 according to one embodiment.

An exemplary remote terminal 101 is illustrated in FIG. 2. Remote terminal 101 comprises an adaptive radio transmitter 200. Transmitter 200 has an FEC encoder 201, pilot sequence generator 203, multiplexer 202, upsample and hold 207, spread code generator 205, modulator and up converter 206, and controller 204.

Figure 4:
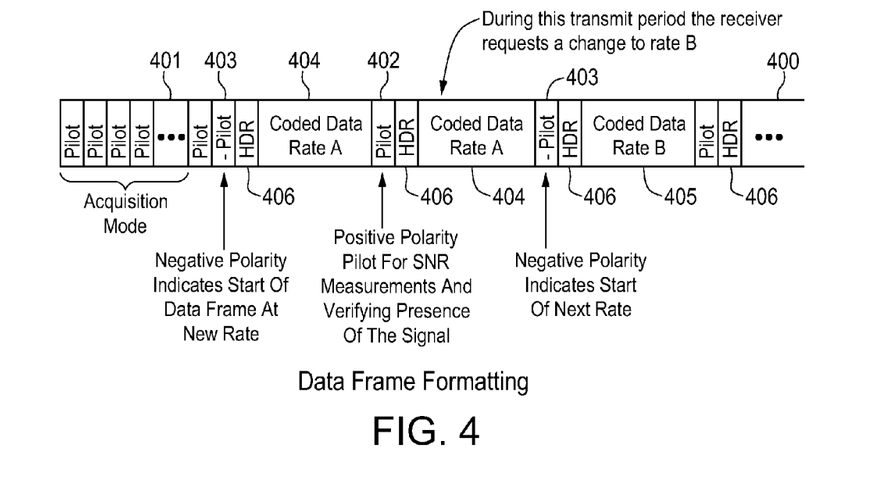
FIG. 4 illustrates an exemplary data framing format utilized in the system of FIG. 1 according to one embodiment.

An input data signal 209 comprises message bits and is converted to a modulated DSSS signal 211 and transmitted by transmitter 200. A non-limiting example of a data frame format of the modulated DSSS signal 211 being transmitted from transmitter 200 according to one embodiment is illustrated in FIG. 4. Data frame 400 comprises in the following sequence a pilot block 401, negative polarity pilot 403, coded data at rate A 404, positive polarity pilot 402, coded data at rate A 404, second negative polarity pilot 403, and coded data at rate B 405. The data frame can also include an optional header 406.

Referring in more detail to transmitter 200 of FIG. 2, FEC encoder 201 receives the message bits and applies forward error correction coding to the bits. Pilot sequence generator 203 is configured to provide pilot sequences to be inserted between the message bits to aid signal detection and synchronization. Outputs from pilot sequence generator 203 and FEC encoder 201 are fed to multiplexer 202, which is configured to insert the pilot sequences into the stream of encoded message bits. Multiplexer 202 is operably connected to upsample & hold 207 which is configured to hold each coded bit for a number of N chips. The upsample & hold 207 is adapted to vary the coded bit hold time in response to a control signal.

Spreading code generator 205 is configured to generate the spreading code for spreading the signal. Alternatively or additionally, one or more pre-generated spreading codes can be stored in an accessible memory (not shown), such as a random access memory (RAM). Outputs from the upsample & hold 207 and spreading code generator 205 are fed to a multiplier 212 for spreading the encoded and upsampled data with a direct sequence spreading code such that the data is spread by the spreading factor N. The spreading factor N is the chip rate to bit rate ratio, also referred to as chips-per-bit. The bit rate, R, is the chip rate (substantially constant for a given system) divided by the spreading factor N. The chip sequence is then fed to modulator and up-converter 206. The resulting DSSS signal 211 is transmitted from the transmitter 200 over the communication channel to base terminal 103.

In the embodiment of FIG. 2, the transmitter has a controller 204 for receiving spreading factor commands 208 received over back-channel 104. Controller 204, which is connected to the multiplexer 202 and to the upsample & hold 207, is adapted to receive spreading factor commands 208 sent from base terminal 103. Spreading factor commands 210 can be preset based on a forecast of the channel quality conditions. Preset commands 210 can be stored locally in the transmitter or stored remotely and accessible by the transmitter. Controller 204 is configured to control the upsample 207 to dynamically vary the spreading factor in accordance with the spreading factor commands 208, 210. Preset spreading factor commands 210 can be utilized instead of or in addition to spreading factor commands received over the back channel. In this particular embodiment, controller 204 is configured to flag multiplexer 202 to incorporate pilot sequences with variable polarity to acknowledge receiving spreading factor commands. Optional headers 406 containing the spreading factor can also be fed to multiplexer 202.

Figure 3:
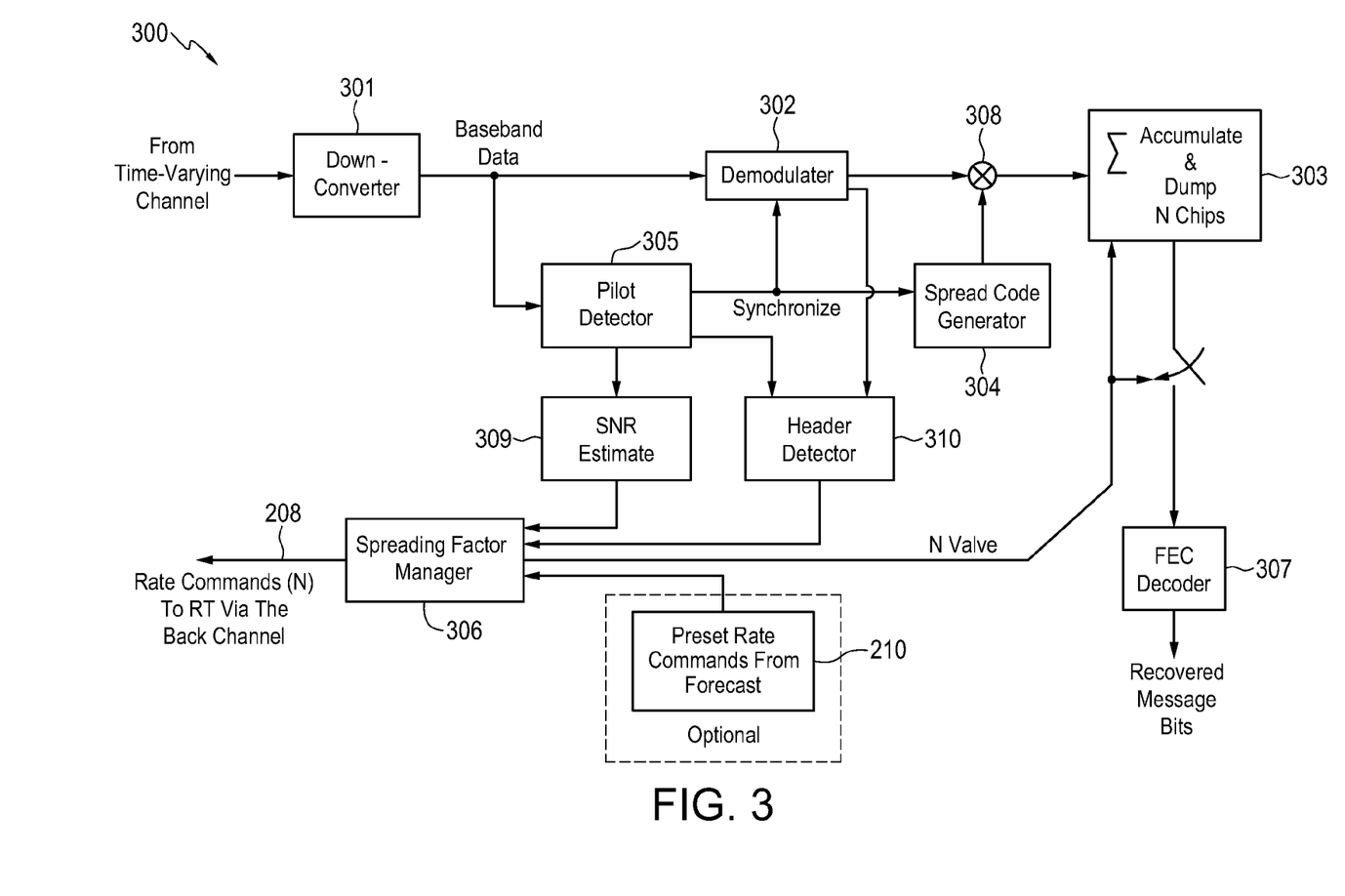
FIG. 3 illustrates a block diagram of an exemplary base terminal of the system of FIG. 1 according to one embodiment.

Referring now in more detail to base terminal 103, an exemplary base terminal adapted according to one embodiment is illustrated in FIG. 3. Base terminal 103 comprises an adaptive radio receiver 300. Receiver 300 has a downconverter 301, pilot detector 305, demodulator 302, spread code generator 304, accumulator 303 that integrates for controllable N chips and dumps, FEC decoder 307, a spreading factor manager 306, and header detector 310. Downconverter 301 is configured to convert the DSSS radio signal 211 received over the communication channel 104 down to baseband frequency. Pilot detector 305 is configured to detect the pilot sequence 401 incorporated in the received signal (see FIG. 4) and to estimate the operating signal to noise ratio (SNR) 309 which estimate feeds to the spreading factor manager 306. Pilot detector 305 feeds to demodulator 302 and despreading code generator 304.

Demodulator 302 is configured to demodulate the baseband data. Demodulator 302 is configured to lock onto the received signal using the pilot sequence output from the pilot detector. Spreading code generator 304 is configured to provide a matching spreading code for despreading the demodulated signal. Alternatively or additionally, one or more pre-generated spreading codes can be stored in accessible memory, such as random access memory (RAM) (not shown). The generated spreading code of the receiver matches the original spreading code utilized by the transmitter. Spreading code generator 304 is configured to use the pilot detection output signal from the pilot detector to synchronize the receiver spreading code with the spreading code embedded in the demodulated signal. Demodulator 302 and spreading code generator 304 are connected to multiplier 308 which is adapted to multiply the matching spreading code with the demodulated sequence.

Accumulate & Dump 303, which is connected to an output of the multiplier 308, is configured to perform an integrate for N chips operation and dump the despread bit sequence such that the received signal is despread by a spreading factor that matches the original spreading factor utilized in the transmitter. Accumulate & Dump is adapted to enable N (the spreading factor), to be varied in response to an N value control signal. FEC decoder 307 is configured to decode the despread signal to recover an estimate of the original data signal. Spreading Factor Manager 306, which is connected to the Accumulate & Dump 303, is configured to control the Accumulate & Dump 303 to vary the receiver spreading factor. Spreading Factor Manager 306, which is also connected to the Pilot Detector 305, is configured to select the next spreading factor based on the SNR estimate from Pilot Detector 305. Spreading Factor Manager is also configured to transmit spreading factor commands over the back channel between receiver 300 and corresponding transmitter 200 for reception by the transmitter controller 204 to thereby vary the transmitter spreading factor and hence the data rate.

As indicated above, pilot detector 305 is configured to utilize the received pilot sequence to estimate over time operating quality between the transmitter from which the signal is being transmitted and the receiver. An SNR estimate output signal 309 is fed from the pilot detector 305 to spreading factor manager 306. As will be explained in more detail below, spreading factor manager is configured to use the SNR estimate and a provided quality of service specification to determine when the operating quality between transmitter 200 and receiver 300 reaches a particular threshold and to generate command signals to accordingly change the matching spreading factor utilized in receiver 300 and transmitter 200 to maintain a specified quality of service.

A method of operating the communication system of FIG. 1 in a closed loop according to one embodiment will now be described in detail with reference to the flow diagram of FIG. 6 in conjunction with FIGS. 2 to 4.

Figure 6:
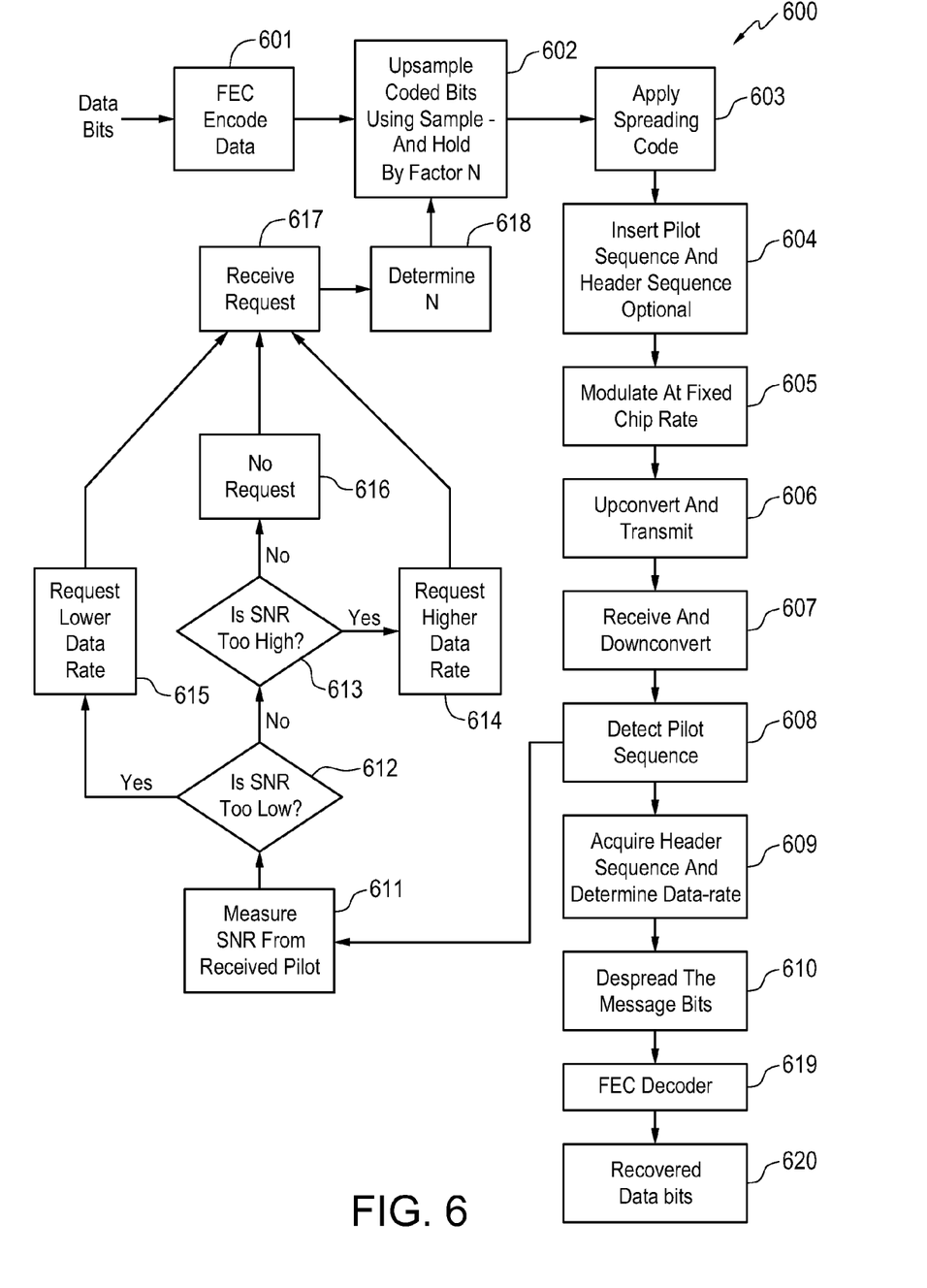
FIG. 6 illustrates a flow diagram outlining an example of a method of operating the communication system of FIG. 1 according to one embodiment.

As indicated in FIG. 6, initially FEC encoder 201 applies a forward error correction code to the input data signal message bits (601). More than one FEC code can be applied with different coding rates if a finer granularity of the signal data rate is required. In an alternative embodiment of the receiver, FEC encoding can be omitted. The resulting FEC encoded data bits are upsampled and held by a spreading factor N (602). A direct sequence spreading code is applied via multiplier 212 to the upsampled and held code bit (603). The resulting code is a direct sequence spread spectrum signal spread by a spreading factor N. The spreading code is a pseudo-random chip sequence. The exact spreading code is known a priori to both the receiver and transmitter.

As already mentioned above, the spreading factor can vary between 1 to N in integer steps and is the chip rate to bit rate ratio, or number of chips-per-bit. Every bit of the coded message data is composed of between 1 and N chips, and chips are the atomic unit of transmission. A spreading factor of 1 is effectively no spreading and represents the maximum data rate. The maximum data rate is determined by the transmitter processor speed and available bandwidth. The minimum data rate occurs at a spread factor N and is determined by the range of spread factors required in the application and the ability of the base terminal to acquire and lock to the DSSS signal. The length of the pilot sequence must be increased as the maximum possible N increases such that at the highest spreading factors the pilot sequence may be detected at anticipated worst case channel conditions.

The direct sequence spread data frames can be prepended with a pilot sequence and optional header sequence (604). Pilot sequence generator 203 inserts the pilot sequence, which is known a priori to both the remote terminal and base terminal. The pilot sequence length is chosen to provide reliable acquisition at worst case channel conditions. An optional header sequence can also be inserted into the frame to indicate the FEC rate and/or DSSS spreading factor of the frame. A header sequence is used for example when the system is a point to multipoint system. An exemplary frame format is shown in FIG. 4.

The framed data is modulated at a fixed chip rate (605). Modulator 206 may modulate the chips using any of a number of methods. Some non limiting examples are Binary Phase Shift Keying (BPSK) or Minimum Shift Keying (MSK) signal modulation. This greatly simplifies the base terminal demodulator. MSK is a non-linear continuous phase modulation that does not vary signal amplitude allowing the use of power-efficient saturated power amplifiers for transmission. When the chip rate is constant, the modulated waveform does not change, despite the change in the number of chips-per-bit. The methods and systems of the illustrative embodiments are however not limited to the use of any particular modulation technique. Any type of signal modulation can be adopted.

The modulated signal is upconverted and the resulting modulated DSSS signal transmitted (606). In the particular embodiment of FIG. 6, the modulated DSSS signal 211 is transmitted utilizing substantially constant transmission power and substantially constant bandwidth.

Modulated DSSS signal 211 is transmitted over the communication channel to the receiver of the base terminal 103. Modulated DSSS signal is received by receiver 300 and downconverted (607). Downconverter 301 down converts the received DSSS signal to baseband. The pilot sequence is detected (608).

The data rate is then determined (609). Receiver 300 can derive a change in spreading factor/data rate and synchronize the change with the transmitter utilizing different methods. In the embodiment of the system and method of FIGS. 1-4 and 6, the transmitter can frame the next spreading factor/data rate in the header sequence, and the receiver can use the header to synchronize with the transmitter and determine the next spreading factor/data rate by reading the received header. Headers 406 are detected by the header detector 310, and the detected header information is forwarded to the spreading factor manager 306. The header approach is particularly useful for a point to multipoint system (see for example system of FIG. 7 described hereinafter) in which multiple base terminals (one master, multiple slaves) are to be used so that all the base terminals may determine the spread factor employed by the remote terminal.

In another embodiment of the system and method, a pilot sequence polarity-switch inserted in between the transmitting DSSS code is utilized to handshake between the receiver and transmitter to indicate a change in spreading factor/data rate. FIG. 4 illustrates an exemplary transmitted DSSS signal pilot having a sequence polarity. The pilot acquisition circuitry of the receiver can determine from first negative polarity 403 of the transmitted DSSS signal the start of a data frame at a new data rate A. The receiver can also use either polarity sequence 402, 403 as a pilot for SNR measurements and verifying presence of signal. Second negative polarity 403 allows the receiver to determine the start of the next rate, coded data rate B. The data rate/spreading factor need not be sent in a header when employing handshaking. Instead, the change in spreading factor is determined from the spreading factor manager 306 which sends a control signal to the upsample and hold to adjust the spreading factor based on the new data transmission that it determined. This technique provides increased communication security since the data rate/spreading factor is not transmitted in the channel; it also reduces system complexity. It also increases communication efficiency since the header need not be transmitted or displace data.

In one example, handshaking is performed by the transmitter and receiver operating in two different modes. In mode 1, the acquisition mode, the remote transmits the pilot sequence 401 continuously (see FIG. 4 for frame format example). This aids the receiver in rapidly acquiring and locking to the signal. When the signal is acquired, the receiver commands the transmitter into data mode at an initial rate. The transmitter then reverses the polarity of the pilot sequence 403 one time to indicate it is transitioning into data mode at the commanded rate. Data is then transmitted.

Using a pilot or header to communicate a rate change from remote terminal to base terminal, the data rate can change without any external synchronization between the transmitter and receiver. Latency and data rate change synchronization between the base terminal and remote terminal are managed seamlessly. There is no external coordination of events at the base terminal or remote terminal required in order to effect a rate change between them. Embodiments employing handshaking or headers are tolerant to systems that have different communication latency (time for remote terminal to receive and respond to commands) between the remote terminal and base terminal, nor is there a need for accurate knowledge of time at which changes are scheduled. The handshaking 'synchronization' is very simple, effective, and seamless at rate change boundaries.

In the operating method 600 of FIG. 6, the spreading factor N utilized in the transmitter is determined from the header sequence. The signal is demodulated by the demodulator 302. The demodulated signal is despread using a spreading factor matching the spreading factor N (610).

The signal is monitored to estimate the quality of the communication channel. In the particular embodiment of FIG. 6, the quality of the channel is monitored by pilot detector 305 estimating the signal to noise ratio. To this end, the received pilot sequence is correlated with the known pilot sequence utilized in the receiver to estimate the operating SNR (611). The pilot sequence is transmitted by the transmitter at programmable intervals (not necessarily periodic) to enable estimation of the operating SNR at the receiver.

Whilst in the embodiment of FIG. 6, the SNR is estimated from the received pilot sequence, SNR can be estimated utilizing other methods. For example, the SNR can be estimated by looking at the despread signal, such as the output of the accumulate and dump block 303 which is $E_b/N_0$. However, SNR=$(E_b/N_0)/N$, where $N_0$ is the white noise spectral power density. In another example, the SNR can, in some instances, be estimated from the bit error rate at the output of the FEC decoder.

The receiver then determines from the SNR estimate 309 the maximum data rate possible while maintaining a minimum specified quality of service. In order to determine if the specified quality of service is met, the receiver determines if the channel quality is within a quality margin for the current data rate. To this end, the receiver determines if the operating quality has reached a minimum quality threshold or a maximum quality threshold.

In the particular embodiment of FIG. 6, the specified quality of service is considered as the maximum acceptable bit error rate (BER) for the despread signal. The rate manager determines the maximum supported data rate at which the DSSS spread signal meets the specified quality of service based on the estimate of the operating SNR and a known $E_b/N_0$ margin that is provided to the rate manager 306, where $E_b/N_0$ is the ratio of bit-energy to spectral-noise-power. SNR and $E_b/N_0$ are related as SNR=$(E_b/N_0)/N$, i.e. in this context SNR is the measurement of the ratio of the DSSS chip-energy to spectral-noise-power. Every modulation waveform has a known BER, if given a specified $E_b/N_0$. Therefore, an estimate of the received $E_b/N_0$, functionally equivalent to measuring SNR, enables an estimate of the prevailing BER, or enables an estimate of the amount of $E_b/N_0$ margin above a specified maximum BER.

The $E_b/N_0$ margin defines the amount of excess signal power beyond that necessary to maintain the BER below a specified level, assuming spectral noise power, $N_0$, is constant. If the $E_b/N_0$ margin is too small to guarantee reliable communications, or if the $E_b/N_0$ margin is too large to efficiently use the channel, the rate manager determines a new data rate transmission request for commanding the transmitter to adjust to a new data rate that is sufficient to meet the specified quality of service while efficiently using the channel. For example, the rate manager can select the new data rate utilizing a logical function or from a look up table. A discrete number of bit-rates to select from can be defined. The quality margin can be specified at or during operation to whatever level the user of the remote terminal desires. The quality margin can be greater in the forecast mode to prevent an exception to the QOS. If a channel is particularly well behaved, the margin may be turned down to get the most data through the channel. In one embodiment, the margin can be varied with N. When N is 1 and changes to 2, that can be a 3 dB change. Integers greater than 2 are associated with progressively smaller margins than for N=1 (or for low N values).

If the SNR (i.e. $E_b/N_0$) is too low (612), that is, the operating SNR has reached a minimum SNR threshold, rate manager 306 generates a decrease data rate command for requesting the transmitter to decrease the data rate sufficiently to meet the specified quality of service (615). If the operating SNR is too high (613), that is, the operating SNR has reached a maximum SNR threshold, rate manager 306 generates an increase data rate command for requesting the transmitter to increase the data rate sufficiently to meet the specified quality of service (614). If the operating SNR is within the SNR margin, no data rate command for adjusting the data rate is generated (616).

Following generation of the increase or decrease data rate command, the command is transmitted from the base terminal over the back channel 104. Remote terminal 101 receives the data rate command (617). Transmitter 200 then determines the new spreading factor N to change the data transmission rate of the DSSS signal being transmitted to maintain the specified quality of service (618). The upsample and hold 207 then adjusts the spreading factor N. The data signal is then direct sequence spread by the adjusted spreading factor N to adjust the data rate to the new data rate. The modulated DSSS signal with the new data rate is then transmitted at the specified quality of service. Process 600 continues dynamically. In this manner, a substantially maximum amount of data is transmitted whilst maintaining the specified quality of service The rate of adaptation is variable and can be matched to the timescales of the channel quality variation. Excessive update rates are preferably avoided in order to prevent unnecessary traffic on the back channel from the base terminal to the remote terminal. As indicated above, adaptation need not be periodic or externally synchronized between the remote and base terminal. Illustrative embodiments are tolerant to systems that have different communication latency between the remote terminal and base terminal. Furthermore, there is no need for accurate knowledge of time at which changes are scheduled. The handshaking 'synchronization' embodiment is very simple and effective, and seamless at rate change boundaries.

By adjusting the spreading factor to vary the spread of bits over the chip times and thereby adjust the data rate, a nearly constant $E_b/N_0$ can be maintained, since $E_b/N_0=SNR*N$. By way of a non-limiting example, a direct sequence spread spectrum signal spread at a constant chip rate of 13.7 Mega-chips-per-second (Mcps) is modulated using binary phase shift keying (BPSK) with a root-raised-cosine pulse shape, roll-off-factor 0.75; The waveform will occupy approximately 24 MHz of RF spectrum. If no FEC is used, then at a relatively high SNR of 14 dB no spreading is necessary, and a single message bit is transmitted for each chip. This results in a bit rate of 13.7 Mbps, since the chip rate is 13.7 Mcps. However, if the received SNR is only 9 dB, then in order to stay below the maximum BER, the bits are now spread over two chip times; The chip rate remains at 13.7 Mcps, but the data rate now drops to 6.8 Mbps. Also, the SNR remains at 9 dB, but the $E_b/N_0$ increases to 12 dB, thus reducing the BER to acceptable levels. Similar action is taken for each drop in the signal SNR, with integer changes in the spread factor.

Dynamically adjusting matching spreading factors to adjust the data rate based on the operating quality enables a specified quality of service to be maintained whilst substantially maximizing the amount of data transmitted for available power. High energy efficiency is provided and available channel capacity is substantially maximized. Very low power costs can be achieved by virtue of the pilot sequences aiding acquisition and tracking of exceptionally low SNR DSSS signals such that the DSSS data rates can operate over a wide range of spreading factors. In one non-limiting example N can range from 1 to at least 2048. In the method of operation of the embodiment of FIG. 4, the system maintains the following parameters substantially constant: chip rate, RF (transducer) transmission output power, modulation and signal bandwidth.

As already mentioned, remote terminal and base terminal of FIG. 1 can optionally be operated in an open loop. The variation of the communication channel may be well characterized and predictable. In this event, or when no back channel from the base terminal to the remote terminal is available, the back channel is not utilized. A list of rate/spreading factor changes and times at which to change can be stored, for example in the terminals. Data rate/spreading factor changes and adjustment times are preset based on the estimation over time of the operating quality of the channel being forecast rather than being measured. As indicated above, in transmitter 200 of the embodiment of FIG. 2, preset spreading factor commands 210 from forecast are stored in the transmitter 200 and accessible by controller 204. Similarly, the same preset spreading factor commands can be stored in the receiver 300. Both transmitter 200 and receiver 300 can be configured to switch to an open loop mode in which preset commands 200 rather than commands sent over the back channel from the receiver are used to dynamically adjust the spreading factor. In this case, receiver 300 does not generate the rate commands. The functionality to enable preset commands to be used by transmitter 200 and receiver 300 is optional in the system of FIG. 1.

In another embodiment, the communication system can be configured solely as the aforementioned open loop system. In yet another alternative embodiment, the communication system can be configured solely as the closed loop system.

Figure 7:
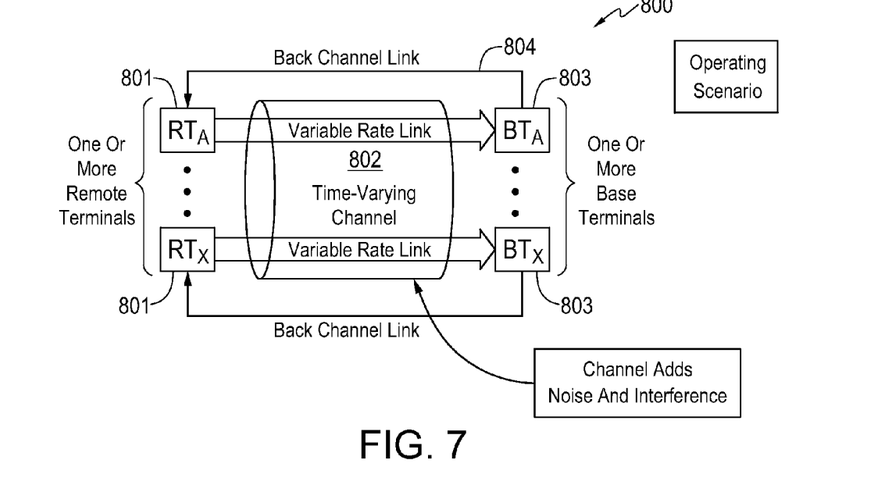
FIG. 7 illustrates an example of a multiple access wireless communication system according to one embodiment.

Reference will now be made to a multiple access wireless communication system according to one embodiment. Referring to FIG. 7, multiple access system 800 has a plurality of remote terminals 801, a shared communication channel 802 and one or more base terminals 803. Remote terminals 801 and base terminals 803 are configured to access and share communication channel 802. In this particular embodiment, the shared communication channel is a Code Divisional Multiple Access (CDMA) channel.

Each remote terminal 801 and base terminal 803 are similar to remote terminal 101 and base terminal 103, respectively, of the embodiment of FIG. 1, with the exception that the terminals are further adapted to include unique and uncorrelated spreading codes that allow CDMA channel sharing. Each remote terminal 801 is assigned a unique spreading code and the base terminal(s) 803 utilize matching spreading codes to recognize and despread respective DSSS signals from respective remote terminals.

An exemplary operating scenario for multiple terminals sharing the communication channel is illustrated in FIG. 7. In this particular embodiment, each remote terminal 801 is configured to operate with base terminal(s) 803 in the aforementioned closed loop control mode using an associated back channel 804. For each DSSS signal being transmitted, the particular remote terminal 801 transmitting the particular DSSS signal and the base terminal 803 receiving the DSSS signal can dynamically adjust the matching spreading factors based on the operating quality such that the specified quality of service is maintained whilst a substantially maximum amount of data is transmitted. In this manner, system 800 automatically fully allocates channel capacity to the remote terminals and base terminals currently using the shared channel without the need for further control systems. The specified quality of service, quality margin, and maximum amount of data transmitted need not be the same for each remote and base terminal communication. Furthermore, for each remote terminal to base terminal connection the quality margin can vary as a function of the spreading factor as already explained above.

Figure 8:
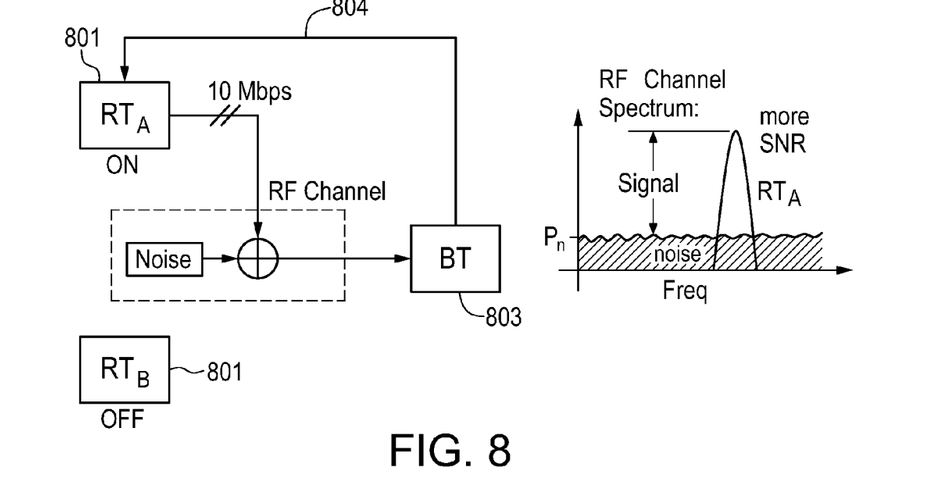
FIG. 8 illustrates an exemplary first remote terminal of the system of FIG. 7 transmitting alone over the communication channel according to one embodiment.
Figure 9:
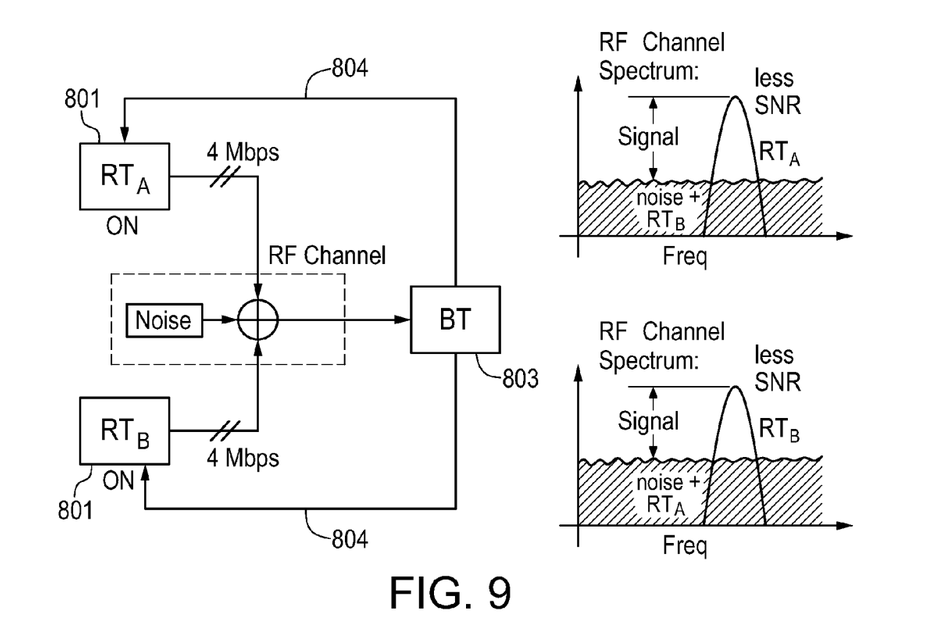
FIG. 9 illustrates the exemplary first remote terminal of the system of FIG. 7 sharing the communication channel with a second remote terminal of the system according to one embodiment.
Figure 10:
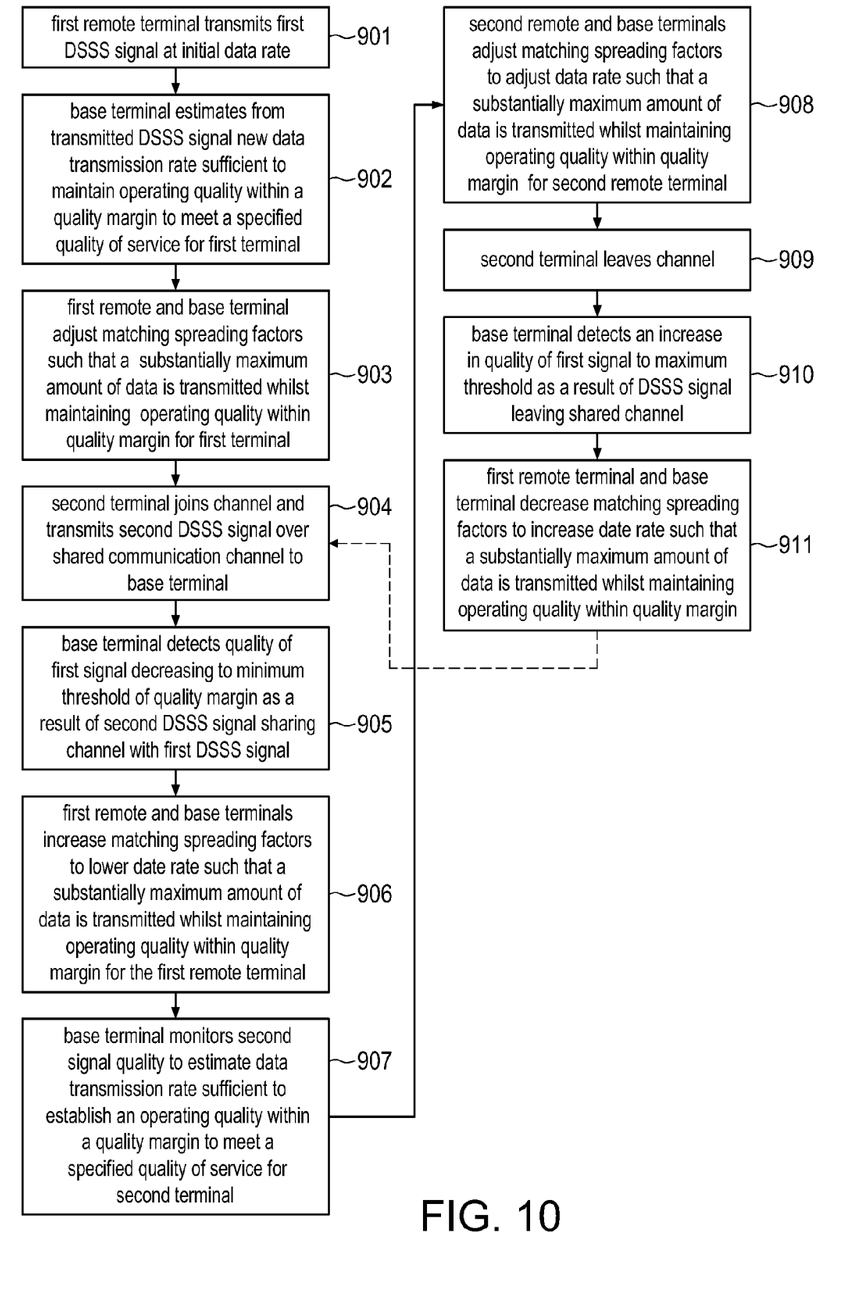
FIG. 10 illustrates a flow diagram of an example method for improving channel utilization in a multiple access wireless communication system according to one embodiment.

In order to more adequately explain the method of operation of the multiple access communication system of FIG. 8, reference will now be made to a particular non-limiting operating scenario. Consider that a first remote terminal 801 (user) is using the shared channel 802 to communicate to a base terminal 803 and that a second remote terminal 801 (new user) then joins the shared channel to also communicate with the base terminal 803. FIG. 8 illustrates an example of the first remote terminal $RT_A$ 801 alone on the shared channel and communicating with a base terminal. FIG. 9 illustrates an example of the first terminal $RT_A$ and the second terminal $RT_B$ sharing the channel to communicate with the base terminal. FIG. 10 illustrates a flow chart outlining the method of operation of the first and second terminals in this example scenario.

First remote terminal $RT_A$ initially establishes a substantially maximum data rate at a specified minimum quality of service. To this end, as indicated in FIG. 10, first remote terminal transmits first DSSS signal at initial data rate (901). Base terminal estimates new data transmission rate that is sufficient to maintain the operating quality within a quality margin to meet a specified quality of service for first terminal (902). First remote and base terminal adjust matching spreading factors such that the operating quality is maintained within the quality margin so that a substantially maximum amount of data is transmitted at the specified quality of service (903). In the particular example of FIG. 8, base terminal BT estimates the SNR in the signal and decides that first terminal $RT_A$ can transmit at a data rate of 10 Mbps to provide an operating quality within a quality margin to meet a specified quality of service. Base terminal sends a command to the first terminal $RT_A$ to adjust the spreading factor to change the data rate to 10 Mbps to meet the specified quality of service. Since the second remote terminal $RT_B$ is off, there is no interference and the first terminal maintains the specified quality of service at 10 Mbps and is transmitting the maximum amount of data for the specified quality of service at current channel conditions.

Second remote terminal turns on and joins the channel and transmits a second DSSS signal over the shared communication channel to the base terminal (904). Base terminal monitors the SNR estimates of the first signal decreasing to a minimum threshold of a quality margin as a result of second DSSS signal sharing channel with first DSSS signal (905). In the example of FIG. 9, the base terminal is measuring quality in terms of SNR. The SNR from noise and interference from $RT_B$ reduces the SNR for the signal from $RT_A$ to a minimum SNR threshold within a SNR margin. A sufficient SNR margin must be used such that the decline in SNR when new users join the channel does not violate the quality of service requirement.

First remote and base terminals increase matching spreading factors to lower data rate such that the operating quality for the first remote terminal is maintained within the quality margin whilst substantially maximizing the amount of data being transmitted for the new channel conditions (906). In the example of FIG. 9, the base terminal determines that the first terminal $RT_A$ has to lower the data rate from 10 Mbps to 4 Mbps to maintain the SNR estimate within the SNR margin and meet the specified quality of service. Base terminal sends a command requesting same to the first remote terminal $RT_A$. In response, both the first remote and base terminals then adjust the matching spreading factors to lower the data rate from 10 Mbps to the data rate of 4 Mbps such that the specified quality of service is maintained whilst the amount of data transmitted is substantially maximized for constant power.

Base terminal monitors second signal quality to estimate data transmission rate that is sufficient to establish an operating quality within a quality margin to meet a specified quality of service for second terminal (907). Second remote and base terminals adjust matching spreading factors to adjust data rate such that the operating quality is maintained within a quality margin so that a substantially maximum amount of data is transmitted whilst maintaining the specified quality of service for the second terminal (908). In the example of FIG. 9, the base terminal estimates SNR from noise and interference contributed from first terminal $RT_A$ and determines $RT_B$ has to set an initial rate of 4 Mbps to provide an operating SNR within a SNR quality margin for $RT_B$ to meet a quality of service specified for $RT_B$. Base terminal sends a command requesting same to second remote terminal $RT_B$. In response, both the second terminal $RT_B$ and the base terminal adjust the matching spreading factors to establish the initial data rate of 4 Mbps to provide the operating SNR within the SNR quality margin for $RT_B$ to meet the quality of service for $RT_B$.

Following transmission, second terminal leaves the channel (909). Base terminal monitors an increase in quality of first signal to maximum threshold as a result of DSSS signal leaving shared channel (910). First remote terminal and base terminal monitor decrease matching spreading factors to increase data rate such that operating quality is maintained within the quality margin so that the amount of data transmitted is substantially maximized for the specified quality of service (911). For the example of FIGS. 8 & 9, the base terminal detects an increase in SNR to a maximum threshold for the first terminal $RT_A$ as a result of the second terminal $RT_B$ leaving the channel and determines $RT_A$ can increase the data rate from 4 Mbps back to 10 Mbps to maintain the operating SNR within the SNR margin to meet the specified quality of service. Base terminal sends command requesting the new data rate. Both first terminal $RT_A$ and base terminal decrease the spreading factors to increase the data rate to 10 Mbps to maintain the quality of service.

Whilst in the aforementioned example of FIGS. 8 & 9 there are two remote terminals and one base terminal, the method of operation is the same for each and every remote terminal and base terminal operating over the shared channel. The multiple access communication system of the illustrative embodiments seamlessly adapts to multiple remote terminals (users) sharing the channel, allocating it amongst the remote terminals (users) as the number of remote terminals using the channel varies over time. The remote terminals and base terminals achieve this automatically without any additional synchronization or processing to control channel allocation.

In another embodiment of the multiple access system and method, the shared channel can be provided by means of frequency hopping rather than CDMA. Such frequency hopping techniques are known to a person of ordinary skill in the art.

The multiple access communication systems of the illustrative embodiments are tolerant to interference (unintentional) and jamming (intentional). When interference or jamming occurs on the channel, the spreading factors are automatically adjusted to maintain the specified quality of service at a substantially maximum data rate for each remote terminal sharing the channel.

Since the communication systems of the illustrative embodiments adapt in real time, systems already deployed (satellites already launched, for example) can be upgraded by improving the base terminal (i.e. increasing antenna gain). This enables reduction in 'stranded' capital in deployed systems that cannot be upgraded after deployment. Further, the same remote terminal may successfully communicate with various base terminals of different capabilities. For example, a large dish antenna base terminal can successfully communicate with a remote terminal at a high data rate. Later, the same remote terminal, without modification, can successfully communicate with a different base terminal with a smaller antenna (perhaps for mobility) at a lower data rate. This flexibility is valuable for providing communication to base terminals of widely varying cost and features.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The embodiments of the invention in which an exclusive property or right is claimed are defined as follows.

Having thus described the invention what is claimed is:

1. A wireless communication system comprising:
at least one remote terminal;
at least one base terminal; and
a communication channel coupled between said at least one remote terminal and said at least one base terminal;
wherein said remote terminal is configured to:
apply a direct sequence spreading code to a data signal at a spreading factor to provide a direct sequence spread spectrum (DSSS) signal;
insert pilot polarity sequences in said DSSS signal for signaling an adjustment in a data rate and said spreading factor; and
transmit said DSSS signal, after inserting said pilot polarity sequences, over said communication channel to said base terminal;
wherein said base terminal is configured to:
receive said DSSS signal from said remote terminal;
despread said received DSSS signal using a matching spreading factor that matches said spreading factor utilized to spread the data signal;
utilize said pilot polarity sequences to perform an adjustment of said matching spreading factor to despread said DSSS signal; and
wherein said remote terminal and said base terminal are configured to:
dynamically vary the spreading factor and matching spreading factor to adjust the data rate based on an estimation of operating quality over time between the remote terminal and base terminal such that the amount of data being transmitted is substantially maximized whilst providing a specified quality of service.

2. The system of claim 1, further comprising a back channel coupled between said remote terminal and said base terminal; wherein said base terminal is further configured to dynamically:
monitor said received DSSS signal to estimate said operating quality over time;
determine if said estimated operating quality has exceeded a limit of a quality margin;
in response to said estimated operating quality exceeding said quality margin limit, estimate a next data transmission rate to provide an operating quality within said quality margin such that said specified quality of service is met for said next data rate;
send a command over said back channel to said remote terminal for adjusting the spreading factor to adjust to the next data rate; and
wherein said remote terminal and said base terminal are configured to dynamically adjust said spreading factor and matching spreading factor to adjust the data rate to the next data rate such that said operating quality is maintained within said quality margin thereby maintaining said specified quality of service.

3. The system of claim 2, wherein said base terminal is further configured to:
determine said operating quality has exceeded a minimum threshold of said quality margin;
determine a lower data transmission rate for providing said operating quality within said quality margin to meet said specified quality of service in response to said operating quality exceeding said minimum threshold;
transmit to said remote terminal over said back channel an increase spreading factor command for commanding said remote terminal to increase said spreading factor to adjust to said lower data transmission rate;
wherein said first terminal and base terminal are configured to:
increase said spreading factor and matching spreading factor to lower the data rate to provide said specified quality of service at said lower data transmission rate;
wherein said base terminal is configured to:
determine said operating quality has exceeded a maximum threshold of said quality margin;
determine a higher data transmission rate for providing said operating quality within said quality margin to meet said specified quality of service in response to said operating quality exceeding said maximum threshold;
transmit to said remote terminal over said back channel a new spreading factor command for commanding said remote terminal to decrease said spreading factor to adjust to said higher transmission rate; and
wherein said first terminal and base terminal are configured to: decrease said spreading factor and matching spreading factor to provide said specified quality of service at said higher data transmission rate.

4. The system of claim 1, wherein said remote terminal is further configured to: insert a transmit pilot sequence in said DSSS signal being transmitted; and wherein said base terminal is configured to: search and detect said pilot sequence of said transmitted DSSS signal; and acquire said transmitted DSSS signal utilizing said searched pilot sequence.

5. The system of claim 4, wherein said spreading factor is dynamically variable between spreading factors of 1 to N in integer steps, and wherein N is 2048 or more.

6. The system of claim 1, wherein said remote terminal is configured to transmit said DSSS signal to said base terminal at substantially constant power, substantially constant chip rate, and substantially constant bandwidth.

7. The system of claim 1, further comprising stored preset spreading factor commands for commanding said remote terminal and base terminal to dynamically adjust said spreading factor and matching spreading factor based on a forecast of channel quality such that the amount of data being transmitted is substantially maximized whilst providing said specified quality of service; and wherein said remote terminal and said base terminal are configured to access said stored presets spreading factor commands and dynamically adjust said spreading factor and matching spreading factor according to said preset spreading factor commands to adjust the data rate.

8. The system of claim 1, wherein each one of said remote terminal comprises a code division multiple access transmitter and wherein said base terminal comprises a code division multiple access receiver; and wherein said shared communication channel comprises a code division multiple access communication channel.

9. A multiple access wireless communication system comprising:
- a plurality of remote terminals;
- at least one base terminal;
- a shared communication channel coupled between said plurality of remote terminals said at least one base terminal; and
- a plurality of back channels coupled between said plurality of remote terminals and said base terminal;
- wherein each one of said remote terminals is configured to:
  - apply a direct sequence spreading code to a data signal utilizing an associated spreading code and spreading factor to provide a direct sequence spreading spectrum (DSSS) signal; and
  - transmit said DSSS signal over said shared communication channel to said at least one base terminal;
- wherein said base terminal is configured to:
  - receive respective DSSS signals from respective remote terminals;
  - despread received DSSS signals utilizing respective spreading codes and matching spreading factors that match the spreading codes and spreading factors utilized in respective remote terminals;
  - wherein, for each one of said received DSSS signals, said base terminal is further configured to dynamically:
    - monitor said DSSS signal to estimate an operating quality over time between the remote terminal transmitting said DSSS signal and said base terminal;
    - determine that said estimated operating quality has exceeded a limit of a quality margin;
    - in response to said estimated operating quality exceeding said quality margin limit, estimate a next data transmission rate to provide an operating quality within said quality margin such that said specified quality of service is met for said next data rate;
    - send a command over a back channel from the plurality of back channels to said remote terminal transmitting said DSSS signal for adjusting the spreading factor to adjust the data rate to said estimated next data rate; and
  - wherein, for each one of said received DSSS signals, said remote terminal transmitting said DSSS signal and said base terminal are configured to dynamically adjust said spreading factor and matching spreading factor to dynamically adjust said data rate to said next data rate such that the amount of data transmitted is substantially maximized whilst providing the specified quality of service for the remote terminal transmitting said DSSS signal.

10. The system of claim 9, wherein said plurality of remote terminals comprise a first remote terminal and a second remote terminal; wherein said first remote terminal is configured to transmit a DSSS signal over said shared communication channel at an initial specified quality of service and initial data rate; wherein said base terminal is further configured to:
- determine for said first remote terminal a lower data transmission rate to provide said operating quality within a quality margin in response to said operating quality exceeding a minimum threshold of said quality margin as a result of said second remote terminal joining said shared communication channel; and
- transmit to said first remote terminal over said back channel an increase spreading factor command for commanding said first remote terminal to increase said spreading factor to adjust to said lower data transmission rate;
- wherein said first terminal and base terminal are configured to:
  - increase said spreading factor and matching spreading factor to provide said operating quality within said quality margin and thereby meet said specified quality of service at said lower data transmission rate.

11. The system of claim 10, wherein said base terminal is further configured to:
- determine for said first remote terminal a higher data transmission rate to provide said operating quality within said quality margin in response to said operating quality exceeding a maximum threshold of said quality margin as a result of said second remote terminal leaving said shared communication channel;
- transmit to said first remote terminal over said back channel a decrease spreading factor command for commanding said first remote terminal to decrease said spreading factor to adjust to said higher data transmission rate;
- wherein said first terminal and base terminal are configured to:
  - decrease said spreading factor and matching spreading factor to provide said operating quality within said quality margin and thereby provide said specified quality of service at said higher data transmission rate.

12. The system of claim 9, wherein each one of said plurality of remote terminals is further configured to insert a header sequence in the DSSS signal to indicate said next data rate and said spreading factor; and wherein, for each DSSS signal being transmitted, said base terminal is configured to utilize the spreading factor in the header sequence to despread the DSSS signal associated with the header sequence.

13. The system of claim 9, wherein each one of said plurality of remote terminals is further configured to:
- insert a transmit pilot sequence in the DSSS signal being transmitted; and
- wherein, for each DSSS signal being transmitted, said base terminal is configured to: search and detect said pilot sequence of said DSSS signal; and acquire said DSSS signal utilizing said detected pilot sequence.

14. A method for improving channel utilization in a wireless communication system comprising:
- direct sequence spectrum spreading a data signal by a spreading factor to provide a direct sequence spreading spectrum (DSSS) signal;
- transmitting said DSSS signal from a remote terminal over a communication channel to a base terminal;
- receiving said DSSS signal from said remote terminal;
- despreading said received DSSS signal using a matching spreading factor that matches said spreading factor utilized to spread the data signal;
- dynamically varying the spreading factor and matching spreading factor to adjust a data rate based on an estimation of operating quality over time between the remote terminal and base terminal such that the amount of data transmitted is substantially maximized whilst providing the specified quality of service;
- monitoring said received DSSS signal to estimate said operating quality over time;
- determining said operating quality has exceeded a limit of a quality margin;

estimating a next data transmission rate to provide said
operating quality within said quality margin to meet said
specified quality of service in response to determining
said operating quality has exceeded said quality margin
limit;

sending a command over a back channel to said remote
terminal for adjusting the spreading factor to adjust to
said next data rate;

adjusting said spreading factor and matching spreading
factor to provide said operating quality within said quality margin such that said specified quality of service is
met at said next data rate; and dynamically performing said monitoring, said estimating
next data rate, said sending said command and said
adjusting said spreading factor and matching spreading
factor to provide said specified quality of service at a
substantially maximum data rate.

15. The method of claim 14, further comprising estimating a lower data transmission rate to provide said operating quality within said quality margin in response to said operating quality exceeding a minimum threshold of said quality margin;

transmitting to said remote terminal over said back channel
an increase spreading factor command for commanding
said remote terminal to increase said spreading factor to
adjust to said lower data transmission rate;

increasing said spreading factor and matching spreading
factor to provide said operating quality within said quality margin at said lower data transmission rate;

estimating a higher data transmission rate to provide said
operating quality within said quality margin in response
to said operating quality exceeding a maximum threshold of said quality margin;

transmitting to said remote terminal over said back channel
a decrease spreading factor command for commanding
said remote terminal to decrease said spreading factor to
adjust to said higher data transmission rate; and decreasing said spreading factor and matching spreading
factor to provide said operating quality within said quality margin at said higher data transmission rate.

16. The method of claim 14, further comprising inserting a transmit pilot sequence in said DSSS signal being transmitted; and searching and detecting said pilot sequence of said DSSS signal; and acquiring said transmitted DSSS signal utilizing said detected pilot sequence.

17. The method of claim 14, further comprising direct sequence spectrum spreading data signals utilizing respective spreading codes and spreading factors to provide a plurality of direct sequence spreading spectrum (DSSS) signals; and transmitting said DSSS signals from respective remote
terminals over a shared communication channel to said
base terminal;

receiving respective DSSS signals from respective remote
terminals;

despreading received DSSS signals utilizing respective
matching spreading codes and spreading factors that
match the spreading codes and spreading factors utilized
in respective remote terminals; and for each one of said DSSS signals:
monitoring said DSSS signal to estimate operating quality over time;

determining said operating quality has exceeded a limit
of a quality margin;

estimating a next data transmission rate to provide said
operating quality within said quality margin such that
said specified quality of service is met in response to
determining said operating quality has exceeded said
quality margin limit;

sending a command over said back channel to the remote
terminal transmitting said DSSS signal for adjusting
the spreading factor to adjust to next data rate; and adjusting said spreading factor and matching spreading
factor to provide said operating quality within said
quality margin at said next data rate; and dynamically performing said monitoring, said estimating said next transmission rate, said sending a command and said adjusting said matching spreading factor and matching spreading factor such that the
amount of data transmitted is substantially maximized whilst providing the specified quality of service.

* * * * *